(12) United States Patent
Mouffron et al.

(10) Patent No.: US 7,774,677 B2
(45) Date of Patent: Aug. 10, 2010

(54) METHOD AND DEVICE FOR TRANSMITTING INFORMATION WITH VERIFICATION OF UNINTENTIONAL AND INTENTIONAL TRANSMISSION ERRORS

(75) Inventors: Marc Mouffron, Saint Remy les Chevreuses (FR); Jean-Michel Tenkes, Plaisir (FR)

(73) Assignee: EADS Secure Networks, Montigny le Bretonneux (FR)

( * ) Notice: Subject to any disclaimer, the term of this patent is extended or adjusted under 35 U.S.C. 154(b) by 960 days.

(21) Appl. No.: 10/596,435

(22) PCT Filed: Dec. 22, 2004

(86) PCT No.: PCT/EP2004/014901

§ 371 (c)(1),
(2), (4) Date: Jun. 13, 2006

(87) PCT Pub. No.: WO2005/064845

PCT Pub. Date: Jul. 14, 2005

(65) Prior Publication Data

US 2007/0140259 A1    Jun. 21, 2007

(30) Foreign Application Priority Data

Dec. 23, 2003   (FR) .................................. 03 15321

(51) Int. Cl.
*H03M 13/00* (2006.01)
(52) U.S. Cl. ................ 714/758; 714/774; 714/819
(58) Field of Classification Search ................ 714/758, 714/774, 819, 704, 708, 755, 762, 761; 707/200, 707/203, 204
See application file for complete search history.

(56) References Cited

U.S. PATENT DOCUMENTS

| | | | | |
|---|---|---|---|---|
| 5,559,814 A | * | 9/1996 | Rolin et al. | 714/819 |
| 5,991,774 A | * | 11/1999 | Tate et al. | 707/203 |
| 6,252,891 B1 | | 6/2001 | Perches | |
| 6,898,753 B2 | * | 5/2005 | Bonifas | 714/774 |
| 6,915,473 B2 | * | 7/2005 | Bolourchi et al. | 714/755 |
| 2002/0170013 A1 | | 11/2002 | Bolourchi et al. | |

FOREIGN PATENT DOCUMENTS

| | | |
|---|---|---|
| FR | 2 839 594 | 11/2003 |
| WO | WO 00/65765 | 11/2000 |

OTHER PUBLICATIONS

International Search Report, PCT/EP2004/014901, Mailing date Jun. 21, 2006, 3 pages.

* cited by examiner

*Primary Examiner*—Fritz Alphonse
(74) *Attorney, Agent, or Firm*—Miller, Matthias & Hull

(57) ABSTRACT

For the transmission of information with verification of transmission errors, a useful information message (M) is transmitted in a determined frame while being associated with a determined number p of transmission error verification bits (CRC,S) also transmitted in the frame. In order to have an element allowing the verification of intentional errors, determined number p1 of the transmission error verification bits form a seal (S) obtained from a determined sealing function, where p1 is a number less than p. Application to radiocommunications equipment requiring the verification of the integrity and the authentication of the messages transmitted.

13 Claims, 3 Drawing Sheets

METHOD AND DEVICE FOR TRANSMITTING INFORMATION WITH VERIFICATION OF UNINTENTIONAL AND INTENTIONAL TRANSMISSION ERRORS

CROSS-REFERENCE TO RELATED APPLICATION

This is the U.S. National Phase of International Application No PCT/EP04/014901 filed 22 Dec. 2004, the entire disclosure of which is incorporated herein by reference

BACKGROUND OF THE INVENTION

1. Technical Field

The present invention relates to a method and a device for allowing the verification of the integrity and the authentication of the origin of a radiocommunication signal.

It pertains to the field of radiocommunications, and more particularly to professional mobile radiocommunication systems or PMR systems.

2. Related Art

It finds applications in radio frequency transmitters incorporated into the base stations and also into the mobile terminals of such a system.

Within the context of PMR systems, the verification of the integrity and the authentication of the origin of a signal consist in verifying that the signal has not been intentionally corrupted by a malicious third party. The aim is, for each mobile terminal, to verify that the radio signal received originates from a base station of the system, and not from a pirate base station, and, vice versa, for each base station to verify that a radio signal received originates from a mobile terminal of the system, and not from a pirate mobile terminal. Stated otherwise, this check makes it possible to detect attacks against the system which consist in sending a message having the characteristics (synchronization, protocol format, coding, etc) of a radio message of the system, but while nevertheless being a false message or a message falsified by an adversary who has intercepted an authentic message.

A false message and a falsified message may be looked upon as messages containing intentional errors introduced by a malicious third party during transmission, as opposed to unintentional errors due to poor conditions of radio transmission.

The detection of unintentional errors during radio transmissions is made possible through the use of a cyclic redundancy code or CRC code, which is formed by transmission error verification bits transmitted in each radio frame while being associated with a useful information message.

The CRC technique is widely used in radiocommunication systems for the transmission of voice or data. CRCs are well known linear functions, some of which are standardized. Thus, to transmit a message M, the code CRC(M) is calculated, then the information M+CRC(M) is coded (channel coding) and transmitted in a frame. On receipt, the information M'+(CRC(M)' received in a frame is decoded (channel decoding), and must satisfy the additional condition CRC(M')=(CRC(M))' in order for it to be possible to consider that M'=M. It will be noted that the technique makes it possible to detect unintentional errors but not to correct them: a corrupted message is simply ignored.

This technique has been adopted without modification by numerous PMR systems (for example TETRAPOL, TETRA, etc) to protect the transmission of radio frames against unintentional errors due to poor radio conditions.

This technique does not however allow the receiver to detect the intentional errors introduced by a malicious third party. Specifically, a characteristic of the CRC is that it is known, so that an adversary can replace/modify the message M with/into a message N, then calculate the code CRC(N) with the perfectly well known CRC, and finally code and transmit the information N+CRC(N) in a frame without the receiver or receivers detecting the least anomaly.

The CRC technique is supplemented in systems like GSM ("Global System for Mobiles") or systems according to the IEEE 802.11 standard, by applying linear encryption (CL) to the information M+CRC(M) to obtain an information item of the same size Z=CL((M+CRC(M))), which is actually coded and transmitted in the frame. This supplement seems to afford a partial response to the integrity requirement since, the frame being encrypted, a malicious third party does not know the message M and cannot substitute a falsified message therefor.

However, in fact, it is still possible to transmit a false message since the encryption and CRC are both linear. Thus, considering a given information word D, the information Z+CL(D+CRC(D)) is in reality equal to the information CL(((M+D)+CRC(M+D))), and constitutes a false message that an attacker knows how to construct and which remains valid as regards the receivers.

The CRC technique supplemented with linear encryption therefore still exhibits the major drawback that the receiver cannot detect intentional errors introduced by a malicious third party.

In fact, the detection of intentional errors would be made possible with the introduction of an additional sealing mechanism, which would however exhibit the drawback of reducing the useful bandwidth.

Specifically, a sealing function produces a seal denoted S(M) in what follows, on a determined number of bits, which ought then to be coded and transmitted in the frame in association with the original message M and the code CRC(M).

SUMMARY OF THE INVENTION

The object of the present invention is to propose a mechanism for verifying integrity and for authenticating the origin of a signal for communications in a radiocommunication system, making it possible to alleviate the aforementioned drawbacks of the prior art.

This aim is achieved, according to a first aspect of the invention, by virtue of a method of transmitting information with verification of transmission errors, wherein a useful information message is transmitted in a determined frame while being associated with a determined number p of transmission error verification bits also transmitted in said determined frame, wherein a determined number p1 of said p transmission error verification bits form a seal obtained from the useful information message using a determined sealing function, where p1 is a number less than p and wherein the p−p1 remaining transmission error verification bits form a cyclic redundancy code calculated from the useful information message.

Stated otherwise, some of the error verification bits that customarily form a cyclic redundancy code associated with the message are replaced with a seal, also called a signature or digest. This replacement yields an element allowing the detection of intentional errors, that is to say the verification of the integrity and the authentication of the origin of the messages, without affecting the useful information throughput (bandwidth) of the system relative to a mechanism for verifying unintentional errors by CRC according to the prior art.

This element is produced in one direction only, with the aid of an integrity key used by the sealing function.

It follows that the invention advantageously allows the introduction of a mechanism for verifying integrity and for authenticating the origin of the messages transmitted in an existing system, in which no bandwidth would have been reserved for this purpose.

The seal could be formed of the entirety of the p transmission error verification bits, that is to say it would be possible to have p1=p. The best performance in terms of integrity would thus be obtained.

Nevertheless, in a mode of implementation, the seal is formed of only some of said p transmission error verification bits, that it to say that p1<p. The p−p1 remaining transmission error verification bits may then form a cyclic redundancy code (CRC). Thus, a CRC is retained specifically for the detection of unintentional errors.

To preserve the inviolability of the integrity key, the p1 transmission error verification bits forming the seal may be calculated at the level of the MAC protocol layer (MAC standing for "Medium Access Control"), then be delivered to a channel coder at the level of the physical layer.

A second aspect of the invention pertains to a device for transmitting information with verification of transmission errors, comprising means for transmitting in a determined frame a useful information message associated with a determined number p of transmission error verification bits also transmitted in said determined frame, and means for obtaining a seal from a determined sealing function, which forms a determined number p1 of said p transmission error verification bits, where p1 is a number less than p, the p−p1 remaining error verification bits forming a cyclic redundancy code calculated from the useful information message.

A third aspect of the invention pertains moreover to radiocommunications equipment comprising a device according to the second aspect. Such equipment may in particular be a mobile terminal or a base station of a radiocommunication system, for example a PMR system.

Other characteristics and advantages of the invention will become further apparent on reading the description which follows. The latter is purely illustrative and should be read in conjunction with the appended drawings.

DESCRIPTION OF PREFERRED EMBODIMENTS

Figure 1:
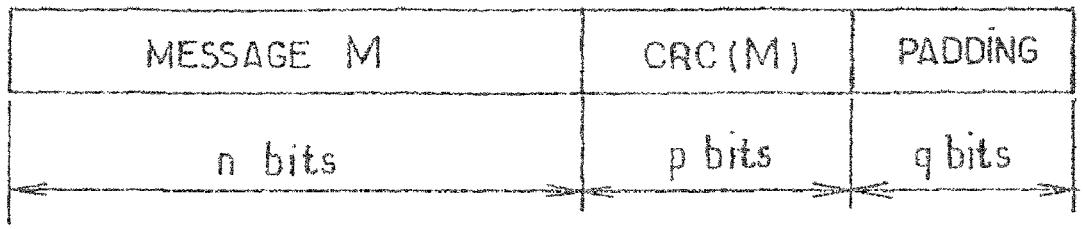
FIG. 1 shows an exemplary frame structure used with a method of transmitting information according to the prior art.

FIG. 1 shows a frame structure conventionally used for the transmission of information by a method according to the prior art.

The frame comprises a useful information message, referenced M in what follows, coded on a determined number n of bits. It also comprises a determined number p of transmission error verification bits which are associated with the message M. These p bits in general form a cyclic redundancy code, hereinafter referenced CRC(M). Finally, the frame comprises a determined number q of padding bits.

In a radiocommunication system, such a frame is sent in a burst and is therefore of relatively reduced size. In an example, n=92, p=10, and q=3, so that the frame comprises a total of 105 bits.

Figure 2:
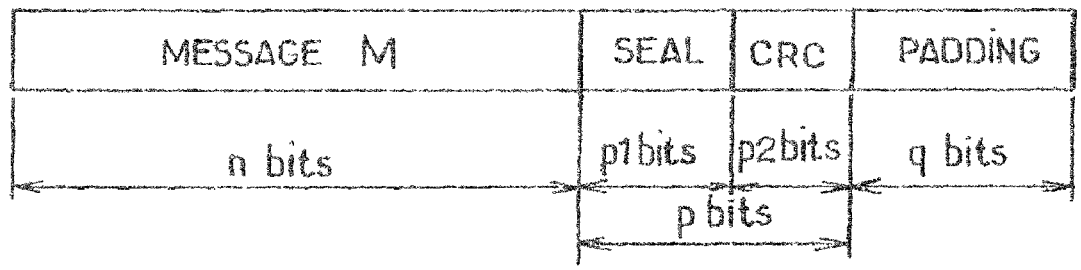
FIG. 2 shows a first exemplary frame structure used with a method according to the present invention.

The diagram of FIG. 2 illustrates an exemplary frame structure usable with a method according to the invention.

In this example, a determined number p1 out of the p transmission error verification bits form a seal obtained from a determined sealing function where p1 is a number less than or equal to p. In this example, the other p2 transmission error verification bits, where p2=p−p1, still form a cyclic redundancy code. The n bits of the message M, as well as the q padding bits, are not modified with respect to the frame structure according to the prior art which is represented in FIG. 1.

Stated otherwise, the method according to the invention consists in this example in replacing the CRC on p bits by a CRC on p2 bits, and in introducing a seal of p1 bits, where p1+p2=p.

Figure 3:
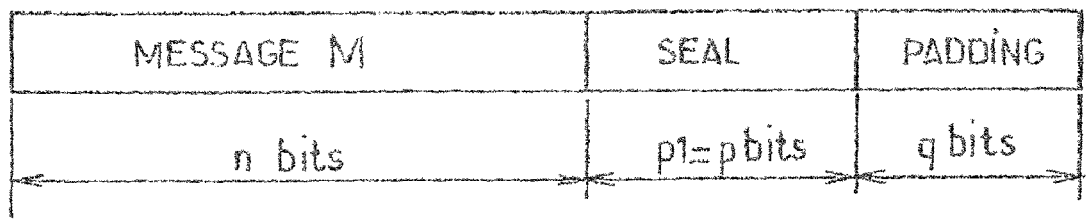
FIG. 3 shows an exemplary frame structure constituting an alternative to that of FIG. 2.

Another frame structure, which is illustrated in FIG. 3, is distinguished from the example above in that the seal is formed of the entirety of the p transmission error verification bits associated with the message M. Stated otherwise, using the above notation, p1=p and p2=0.

By introducing a sealing it is possible to detect unintentional errors (customary role of the CRC) and also to combat the intentional falsification of the message by an adversary who has intercepted the message. It is noted that, having regard to the radio transmission conditions, an element protecting against unintentional errors is however obligatory, and by implementing it (at least in part) in the form of a seal of the same size (at most) as a CRC, the useful bandwidth is not reduced relative to the known implementations by CRC.

Figure 4:
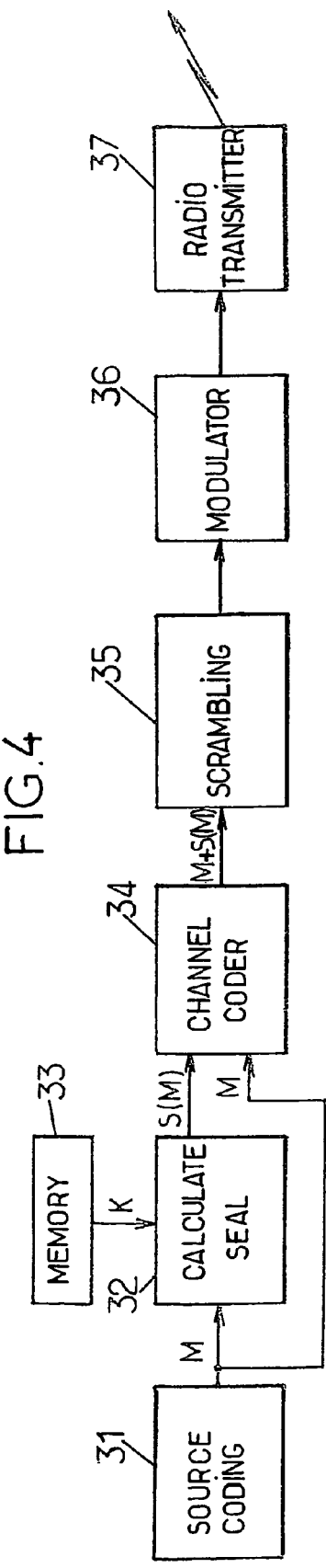
FIG. 4 is a schematic diagram of a radio send chain for the implementation of the method according to the invention.

FIG. 4 diagrammatically shows a radio send chain for the implementation of the method according to the invention. Such a sender is for example incorporated into the mobile terminals and into the base stations of a radiocommunication system implementing the invention.

A source coder 31, generally called a Codec, provides a string of useful information messages M from an analogue signal, for example a speech signal. The messages M are digital voice information messages coded on n bits. As a variant, the messages M are digital data messages originating from any data source. The messages M are transmitted to a seal calculation module 32, which also receives an integrity key K stored in a protected memory 33. The key K is secret. From a message M and from the key K, the module 32 calculates a seal S(M) from a determined sealing function S. The seal S(M) and the message M are input to a channel coder 34 which introduces them into the frame structure represented in FIG. 2 or in FIG. 3. In the case of the frame structure according to FIG. 2, the channel coder 34 also carries out the calculation of the code CRC(M), and introduces it into the frame structure. The information M+S(M), where as appropriates the information M+S(M)+CRC(M), is transmitted to a scrambling module 35, then to a modulator 36, then to a radio send module 37, so as to be sent over the transmission channel inside a burst.

Figure 5:
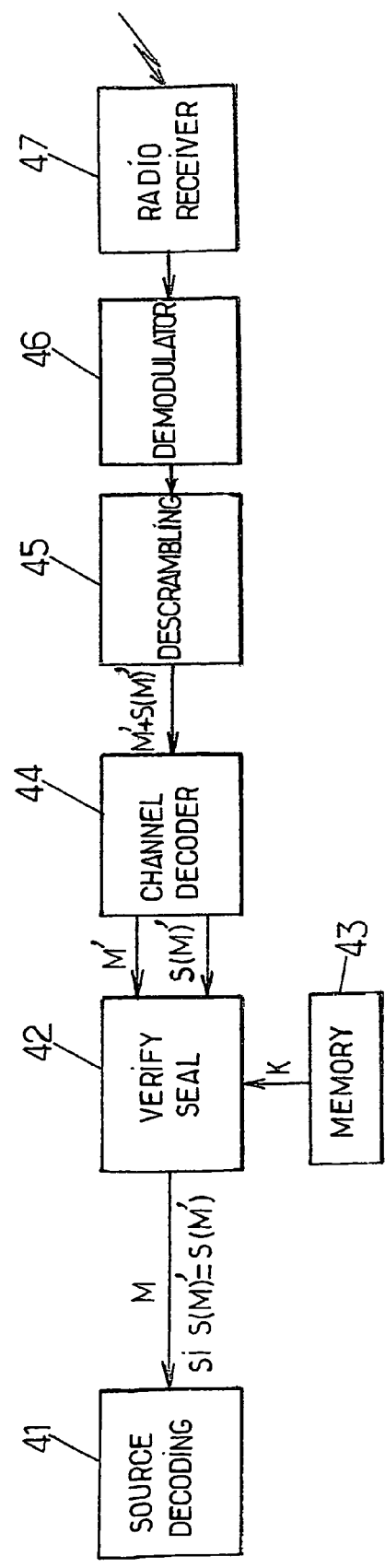
FIG. 5 is a schematic diagram of a radio receive chain for the implementation of the method according to the invention.

FIG. 5 shows a schematic diagram of the received chain of equipment for the implementation of the method according to the invention.

A radio signal is received by a radio receiver 47, then transmitted to a demodulator 46, and thereafter to a descrambling module 45 which delivers an information item M'+S(M)', or even as appropriate the information item M'+S(M)'+CRC(M)'. This information is transmitted to a channel decoder 44, which recovers the information item M' corresponding to the message as received, as well as the information item S(M)' corresponding to the seal as received.

The information items M' and S(M)' are transmitted to a seal verification module 42. When a mode of embodiment with a frame structure according to FIG. 2 is implemented, provision may be made for the information items M' and S(M)' to be transmitted by the channel decoder 44 to the seal verification module 42 only in the absence of unintentional transmission errors, that is to say when CRC(M)'=CRC(M').

The module 42 has as function to verify the integrity and to authenticate the origin of the message M' received. For this purpose it calculates the seal S(M') and compares it with the seal S(M)' received. In case of equality, which signifies that the message received is not corrupted, either by unintentional errors or by intentional errors, the module 42 transmits the message M' to a source decoder 41. In the converse case, which signifies that the message received M' has been corrupted by the introduction of intentional or unintentional errors, the message M' is not processed further. To perform the calculation of the seal S(M'), the module 42 uses the same sealing function S and the same secret key K as send chain. The key K is stored in a protected memory 43 of the received chain.

As will have been understood, when the send chain of FIG. 4 and the received chain of FIG. 5 are incorporated into one and the same radio equipment, the modules 32 and 42 possess elements that are wholly or partly in common. Likewise, the memories 33 and 43 may be one and the same memory.

The modules 32, 34-36, 42 and 43-46 are for example embodied in the form of essentially software modules.

From the point of view of the protocols implemented, the modules 32 and 42 advantageously intervene at the level of the MAC layer ("Medium Access Control") whereas the channel coder 34 and the downstream modules 35, 36 and 37 on the one hand, as well as the channel decoder 44 and the upstream modules 45, 46 and 47 on the other hand, intervene at the level of the physical layer. In this way, the secret key K appears only at the level of the MAC layer alone, whereas the transmission error verification bits appear at the level of the physical layer. It follows that the inviolability of the secret key K is easier to preserve.

Figure 6:
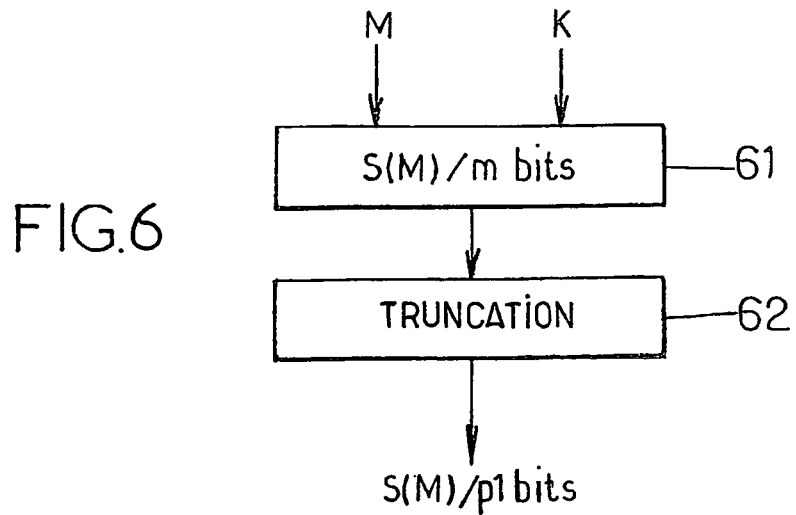
FIG. 6 is a flowchart illustrating the calculation of a seal according to a first mode of implementation of the method according to the invention.

A first mode of calculating the seal S(M) is illustrated by the flowchart of FIG. 6.

In a first step 61, the module 32 uses a sealing function known per se, producing a result on a determined number m of bits, where m may be greater than p1, from the secret key K and from the message M. This result is denoted $S(M)_{/m\ bits}$ in what follows and in the figure.

The sealing function may be a hash function with key, also called a keyed Hash-MAC or HMAC type function ("keyed Hash Message Authentification Code"). For example, this function may be selected from among the following known functions: the MD5 function for which m=128, the SHA-1 function for which m=160, the SHA-256 function for which m=256, etc. These known functions have been published and are available from the NIST ("National Institute of Standard Technologies").

As a variant, a specific Hash function may be deployed, designed on the basis of a block encryption algorithm. Such an algorithm is for example the TDES ("Triple DES") algorithm, or the AES ("Advanced Encryption Standard") algorithm which has been published in order to replace the DES ("Data Encryption System") algorithm.

According to a property of the sealing functions envisaged hereinabove, a modification of a bit in the message M brings about, on average, the modification of one bit out of two in the result $S(M)_{/m\ bits}$.

In a step 62, the seal S(M) on p1 bits, denoted $S(M)_{/p1\ bits}$ in the figure, is obtained by truncating to p1 bits the result $S(M)_{/m\ bits}$ of the sealing function, obtained in step 61. In this way, the seal S(M) does indeed exhibit the maximum number p1 of bits available for its transmission in the frame.

The bits of the result $S(M)_{/m\ bits}$ of the sealing function, obtained in step 61, being equiprobable, according to a probability of the Hash functions envisaged hereinabove, the seal $S(M)_{/p1\ bits}$ resulting from the truncation may be any sequence of p1 bits of the result $S(M)_{/m\ bits}$. The simplest is to select the most significant bits or MSB or the least significant bits or LSB of the result $S(M)_{/m\ bits}$. Of course, the same bits must be selected sender side and receiver side.

The advantage of this first mode of implementation is to allow the use of any sealing function, with a seal of size cut to the desired size by truncating the result of this function if necessary. On the other hand it is possible to have unintentional error detection properties different from those obtained with a linear CRC, for certain types of errors. Specifically, although the detection of errors is the same for an error probability that is uniform over the whole set of messages transmitted, it will be less favourable in the case of a non-uniform probability.

Figure 7:
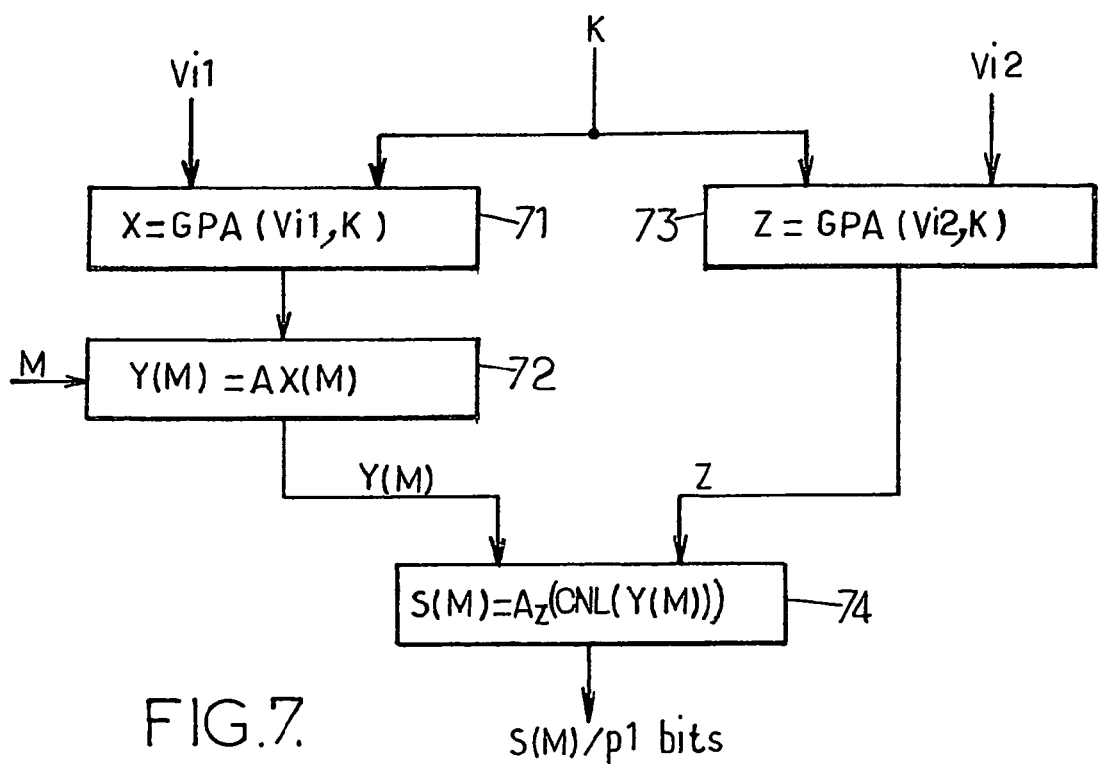
FIG. 7 is a flowchart illustrating the calculation of a seal according to a second mode of implementation of the method according to the invention.

This is why a second mode of calculating the seal S(M), illustrated by the flowchart of FIG. 7, provides the use of a specific sealing function.

This function is adapted to guarantee the detection of unintentional errors in the same way as a CRC. A mathematical function is proposed which comprises the combination, on the one hand, of a pseudo-random generating function GPA and, on the other hand, of a non-linear code CNL. The function GPA generates, from a secret key K and from a determined initialization variable, an encryption string of any length, for example of at most $2^{64}$ distinct values. The CNL code must have a Hamming distance equal to or greater than that of a CRC customarily used in the contemplated type of applications. For equal sizes it is known that there exists a non-linear code which satisfies this property.

With a mathematical function of this type, the detection of intentional errors results from the GPA function, and that of unintentional errors results from the non-linear code CNL. The performance is optimized by choosing a non-linear code CNL having properties to guarantee good Hashing.

Based on a message M to be sealed with a secret key K, an example of such a function comprises the following calculations.

In a first step 71, a variable X is calculated with the aid of the GPA function applied to the key K and to a first initialization variable VI1, in such a way that:

$$X = GPA(VI1, K) \quad (1)$$

Then, in a second step 72, an information item Y(M) is calculated with the aid of a linear matrix $A_X$ constructed from the variable X, and applied to a message M, in such a way that:

$$Y(M) = A_X(M) \quad (2)$$

In a third step 73, which may be performed in parallel with or before steps 71 and 72, the calculation of a variable Z is carried out with the aid of the GPA function applied to the key K and to a second initialization variable VI2, in such a way that:

$$Z = GPA(VI2, K) \quad (3)$$

Finally, in a last step 74, which necessarily takes place after steps 72 and 73, the seal S(M) is calculated with the aid of a linear matrix $A_Z$ constructed from the variable Z, and applied to the information item Y(M), in such a way that:

$$S(M) = A_Z(CNL(Y(M))) \quad (4)$$

As will be immediately apparent to the person skilled in the art, there exists a plurality of functions GPA, of non-linear codes CNL and of linear matrices A satisfying the sought-after aims.

The invention claimed is:

1. A method of transmitting information with verification of transmission errors, comprising the steps of:
    transmitting, through a radio sender, in a determined frame a useful information message associated with a determined number p of transmission error verification bits also transmitted in said determined frame,
    obtaining a seal from the useful information message using a determined sealing function through a seal calculation module, the seal forming a determined number p1 of said p transmission error verification bits where p1 is a number less than p, and
    calculating a cyclic redundancy code from the useful information message formed using the p−p1 remaining transmission error verification bits through a channel coder.

2. The method according to claim 1 wherein the p1 transmission error verification bits are calculated at the Medium Access Control (MAC) protocol layer, and are then delivered to a channel coder at the physical layer.

3. The method according to claim 1, wherein the seal is obtained by truncating to p1 the result of the sealing function which is obtained on a number of bits greater than p1.

4. The method according to claim 3, wherein the sealing function is of Hash Message Authentication Code or Hash-MAC type with key, with a Hash function selected from the group comprising a Message-Digest Algorithm 5 (MD5) function, a Secure Hash Algorithm 1 (SHA-1) function, a Secure Hash Algorithm 256 (SHA-256) function and sealing functions designed on the basis of a block encryption algorithm.

5. The method according to claim 1, wherein the results of the sealing function is obtained directly on p1 bits.

6. The method according to claim 5, wherein the sealing function comprises a combination of a pseudorandom generation function and of a non-linear coding function.

7. A device for transmitting information with verification of transmission errors, comprising:
    means for transmitting in a determined frame a useful information message associated with a determined number p of transmission error verification bits also transmitted in said determined frame, and
    means for obtaining a seal from the useful information message using a determined sealing function, which seal forms a determined number p1 of said p transmission error verification bits, where p1 is a number less than p, the p−p1 remaining bits forming a cyclic redundancy code calculated from the useful information message.

8. The device according to claim 7, comprising means for calculating the p1 transmission error verification bits at the MAC Medium Access Control (MAC) protocol layer, as well as a channel coder to which said p1 bits are delivered at the physical layer.

9. The device according to claim 7, comprising means for obtaining the seal by truncating to p1 the result of the sealing function which is obtained on a number of bits greater than p1.

10. The device according to claim 9, wherein the sealing function is of Hash-MAC type with key, with a Hash function selected from the group comprising a MD5 function, a SHA-1 function, a SHA-256 function and sealing functions designed on the basis of a block encryption algorithm.

11. The device according to claim 7, comprising means for obtaining the result of the sealing function directly on p1 bits.

12. The device according to claim 11, wherein the sealing function comprises a combination of a pseudorandom generation function and of a non-linear coding function.

13. Radiocommunications equipment comprising a device according to claim 7.

* * * * *